United States Patent
Li

(10) Patent No.: US 7,782,582 B2
(45) Date of Patent: Aug. 24, 2010

(54) HIGH VOLTAGE TOLERANT ELECTROSTATIC DISCHARGE PROTECTION CIRCUIT

(75) Inventor: Xiaoming Li, Irvine, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 250 days.

(21) Appl. No.: 11/959,732

(22) Filed: Dec. 19, 2007

(65) Prior Publication Data

US 2009/0161273 A1   Jun. 25, 2009

(51) Int. Cl.
*H02H 3/20* (2006.01)
*H02H 9/00* (2006.01)

(52) U.S. Cl. .................. 361/56; 361/111; 361/91.1
(58) Field of Classification Search .......... 361/56, 361/111, 91.1
See application file for complete search history.

(56) References Cited

U.S. PATENT DOCUMENTS

| | | | |
|---|---|---|---|
| 4,942,346 A * | 7/1990 | Ardit et al. | 318/280 |
| 6,954,098 B2 * | 10/2005 | Hsu et al. | 327/313 |
| 7,102,862 B1 * | 9/2006 | Lien et al. | 361/56 |
| 7,242,561 B2 * | 7/2007 | Ker et al. | 361/56 |
| 7,397,280 B2 * | 7/2008 | Ker et al. | 326/80 |

\* cited by examiner

*Primary Examiner*—Stephen W Jackson
*Assistant Examiner*—Zeev Kitov
(74) *Attorney, Agent, or Firm*—Michael A. Rahman, Esq.

(57) ABSTRACT

An electrostatic discharge (ESD) protection circuit includes an NPN transistor having a collector terminal connected to a voltage source and an emitter terminal connected to the ground via a diode. The NPN transistor includes a base terminal for receiving a base current to turn on the NPN transistor to allow an electrostatic discharge at the voltage source to flow through the NPN transistor to the ground. The ESD protection circuit further includes a PMOS transistor having a source terminal coupled to the voltage source and a drain terminal coupled to the base terminal of the NPN transistor. The PMOS transistor includes a gate terminal for receiving a first and a second gate voltage. The ESD protection circuit further includes an R-C circuit coupled between the source voltage and the ground. The R-C circuit is configured to supply the first gate voltage to the PMOS transistor when there is no electrostatic discharge to turn off the PMOS transistor and the second gate voltage responsive to the electrostatic discharge to turn on the PMOS transistor for a predetermined time period. The ESD protection circuit further includes a voltage divider circuit coupled between the voltage source and the ground and coupled to the R-C circuit.

12 Claims, 3 Drawing Sheets

HIGH VOLTAGE TOLERANT ELECTROSTATIC DISCHARGE PROTECTION CIRCUIT

FIELD OF THE INVENTION

The invention relates to electronic circuits, and more particularly the invention relates to a high voltage tolerant electrostatic discharge (ESD) protection circuit.

BACKGROUND OF THE INVENTION

Electrostatic discharge (ESD) protection circuits are used to protect integrated circuits from damage due to electrostatic discharge. FIG. 1 shows an existing ESD protection circuit 100, comprising a P-channel field effect transistor (PFET) 104, a buffer 108, and an R-C network 112. The R-C network 112 includes a resistor 136 and a capacitor 140. The ESD protection circuit 100 is connected to an integrated circuit 102.

The buffer 108 may be implemented by two inverters (not shown in FIG. 1). The source terminal 116 of the PFET 104 is connected to a source voltage 120, and the drain terminal 124 of the PFET 104 is connected to a ground 128. The PFET 104 includes a gate terminal 132 capable of receiving a low voltage from the buffer 108 to turn on the PFET 104 or a high voltage from the buffer 108 to turn off the PFET 104.

The source voltage 120 is susceptible to electrostatic discharge in the form of short duration, high voltage pulses. During normal operation, the capacitor 140 is charged to approximately equal to the source voltage (e.g., 3.3V) at a node 144, which causes the buffer 108 to supply a high voltage (e.g., 3.3V) to the gate terminal 132. The high voltage at the gate terminal 132 causes the PFET 104 to be turned off.

When electrostatic discharge occurs at the source voltage 120, the capacitor voltage, i.e., voltage at the node 144, remains at approximately the ground level temporarily, causing the buffer 108 to supply a low voltage to the gate terminal 132. The low voltage at the gate terminal 132 turns on the PFET 104, which allows the electrostatic discharge to flow through the PFET 104 thereby protecting the integrated circuit 102. When the capacitor 140 is charged back up to approximately the source voltage level (e.g., 3.3 V), causing the buffer 108 to supply a high voltage to the gate terminal 132, thereby turning off the PFET 104. The time period required by the capacitor 140 to be charged back up is based on the R-C time constant of the R-C network 112. A disadvantage of the circuit 100 is that the maximum operational voltage is limited to the voltage rating of the components, i.e., the buffer 108, the PFET 104 and the capacitor 140.

BRIEF DESCRIPTION OF THE DRAWINGS

For a more complete understanding of the features, example embodiments and possible advantages of the present invention, reference is now made to the detailed description of the invention along with the accompanying figures and in which.

SUMMARY OF THE INVENTION

An electrostatic discharge (ESD) protection circuit includes an NPN transistor having a collector terminal connected to a voltage source, an emitter terminal connected to a ground via a diode, and a base terminal for receiving a base current to turn on the NPN transistor to allow an electrostatic discharge at the voltage source to flow through the NPN transistor to the ground. The ESD protection circuit includes a PMOS transistor having a source terminal coupled to the voltage source and a drain terminal coupled to the base terminal of the NPN transistor. The PMOS transistor includes a gate terminal for receiving a first and a second gate voltage.

The ESD protection circuit includes an R-C circuit coupled between the source voltage and the ground. The R-C circuit supplies the first gate voltage to the PMOS transistor when there is no electrostatic discharge to turn off the PMOS transistor and supplies the second gate voltage to the PMOS transistor responsive to the electrostatic discharge to turn on the PMOS transistor for a predetermined time period. The second gate voltage is lower than the first gate voltage. The PMOS circuit supplies the base voltage to the NPN transistor responsive to the second gate voltage. The ESD protection circuit includes a voltage divider circuit coupled between the voltage source and the ground and coupled to the R-C circuit.

DETAILED DESCRIPTION OF THE INVENTION

Figure 1:
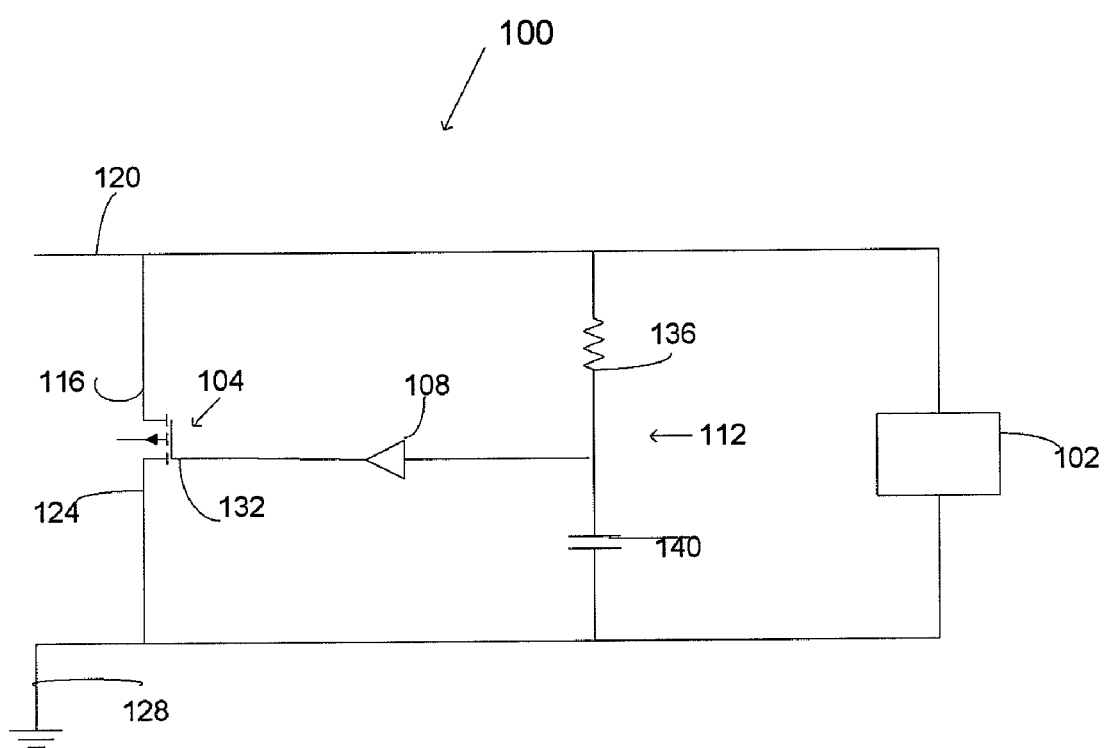
FIG. 1 shows an existing ESD protection circuit.
Figure 2:
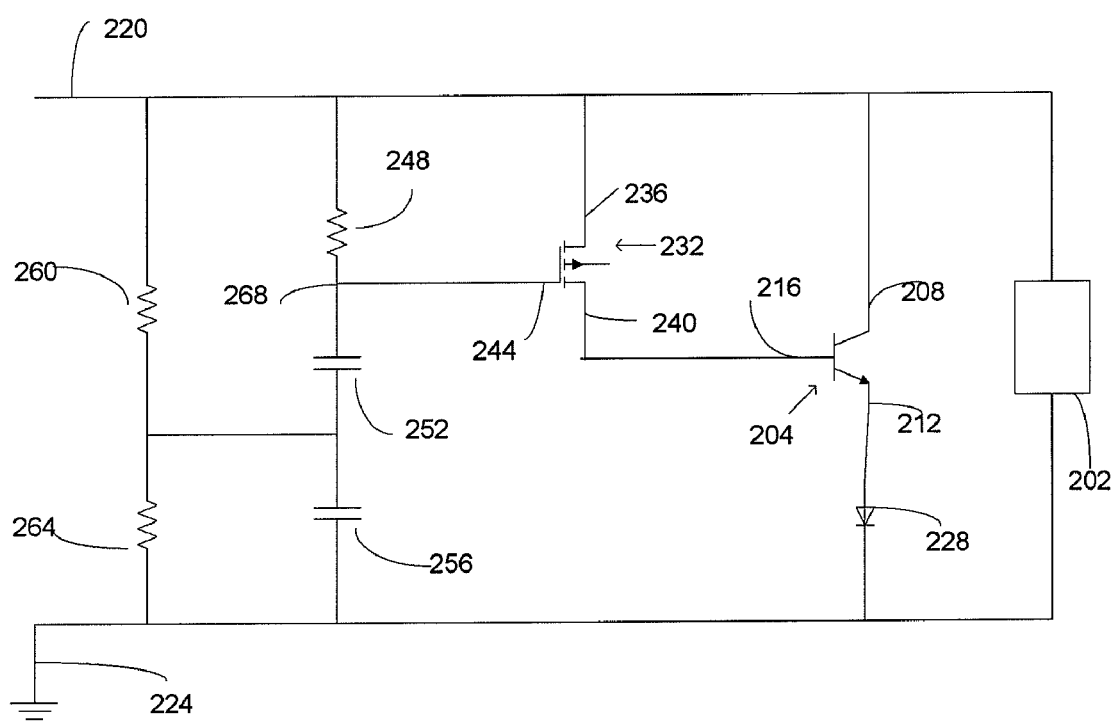
FIG. 2 shows an ESD protection circuit in accordance with one example embodiment.

FIG. 2 shows an electrostatic discharge (ESD) protection circuit 200 in accordance with one embodiment. The ESD protection circuit 200 may be used to protect an integrated circuit 202 from electrostatic discharges.

The ESD protection circuit 200 includes an NPN transistor 204 having a collector terminal 208, an emitter terminal 212 and a base terminal 216. The collector terminal 208 is connected to a voltage source 220, and the emitter terminal 212 is connected to a ground 224 via a diode 228. In one example implementation, the diode 228 is a PN diode having a P terminal connected to the emitter terminal 212 of the NPN transistor 204 and an N terminal connected to the ground 224.

The voltage source 220 may experience electrostatic discharges, which typically may be short duration, high voltage pulses. The electrostatic discharges often cause damage to semiconductor chips that typically operate within a range of 0V to 5 V. As will be discussed below, the ESD protection circuit 200 protects the integrated circuit 202 from electrostatic discharges developing at the voltage source 220.

The ESD protection circuit 200 also includes a PMOS transistor 232 having a source terminal 236, a drain terminal 240 and a gate terminal 244. The source terminal 236 is connected to the voltage source 220 and the drain terminal 140 is connected to the base terminal 216 of the NPN transistor 104. The gate terminal 244 is connected to an R-C network connected between the source voltage 220 and the ground 224. In one example implementation, the R-C network includes a resistor 248 and capacitors 252 and 256 connected in series. The gate terminal 244 is connected to the interconnect point 268 of the resistor 248 and the capacitor 252.

The ESD protection circuit 200 also includes a voltage divider circuit comprising resistors 260 and 264 connected in series between the source voltage 220 and the ground 224. The resistor 264 is also connected in parallel to the capacitor 256.

Normal Operation. During normal operation in the absence of electrostatic discharges, the voltage divider circuit comprising the resistors 260 and 264 bias the R-C network (or R-C circuit) which regulates the voltage drop across the capacitors 252 and 256. The voltage at the gate terminal 244 is maintained substantially equal to the source voltage, thereby turning off the PMOS transistor 232. Since the PMOS transistor 232 is turned off during normal operation, the PMOS transistor 232 does not supply the necessary base current to the NPN transistor 204, thereby turning off the NPN transistor 204.

Operation During Electrostatic Discharge. When electrostatic discharge occurs at the source voltage 220, the capacitors 252 and 256 hold the voltage at the gate terminal 244 to approximately the ground voltage level. When the voltage at the gate terminal 244 decreases, the PMOS transistor 232 is turned on, causing current to flow through the PMOS transistor 232 and into the base terminal 216 of the NPN transistor 204. Responsive to the current at the base terminal 216, the NPN transistor 204 is turned on, causing the electrostatic discharge to flow through the NPN transistor 204 and the diode 228 to the ground. Thus, in response to the electrostatic discharge, the NPN transistor 204 is turned on, thereby providing a path for the electrostatic discharge to flow to the ground, which prevents the integrated circuit 202 from being damaged by the electrostatic discharge. The NPN transistor 204 has an adequate device area implemented on a semiconductor substrate to allow it to absorb the electrostatic discharge at the voltage source 220

As discussed before, the capacitors 252 and 256 are shorted due to the electrostatic discharge. The voltage across the capacitors 252 and 256 rise so that the voltage at the node 268 is approximately equal to the source voltage 220. The rise time of the voltage at the node 268 is primarily determined by the time constant of the R-C network comprising the resistor 248 and the capacitors 252 and 256. As the voltage at the node 268 rises to the source voltage level, the PMOS transistor 232 is turned off, causing the NPN transistor 204 to be turned off.

The voltage divider circuit comprising resistors 260 and 264 and the diode 228 allow the circuit 200 to operate beyond its components' voltage rating. For example, the circuit 200 can protect 5V integrated circuits with 3.3V rated components. Depending on the breakdown voltage ratings of the PMOS transistor 232 and the NPN transistor 204 and the voltage level at the voltage source 220, two or more diodes in series can be used instead of the diode 208.

In one example implementation, the following components were utilized: resistor 248=383K; capacitor 252=1.44 pF; capacitor 256=1.08 pF; resistor 260=129K; and resistor 264=67K. The NPN transistor 204, the PMOS transistor 232 and the diode 228 are selected based on appropriate device size and rating.

Figure 3:
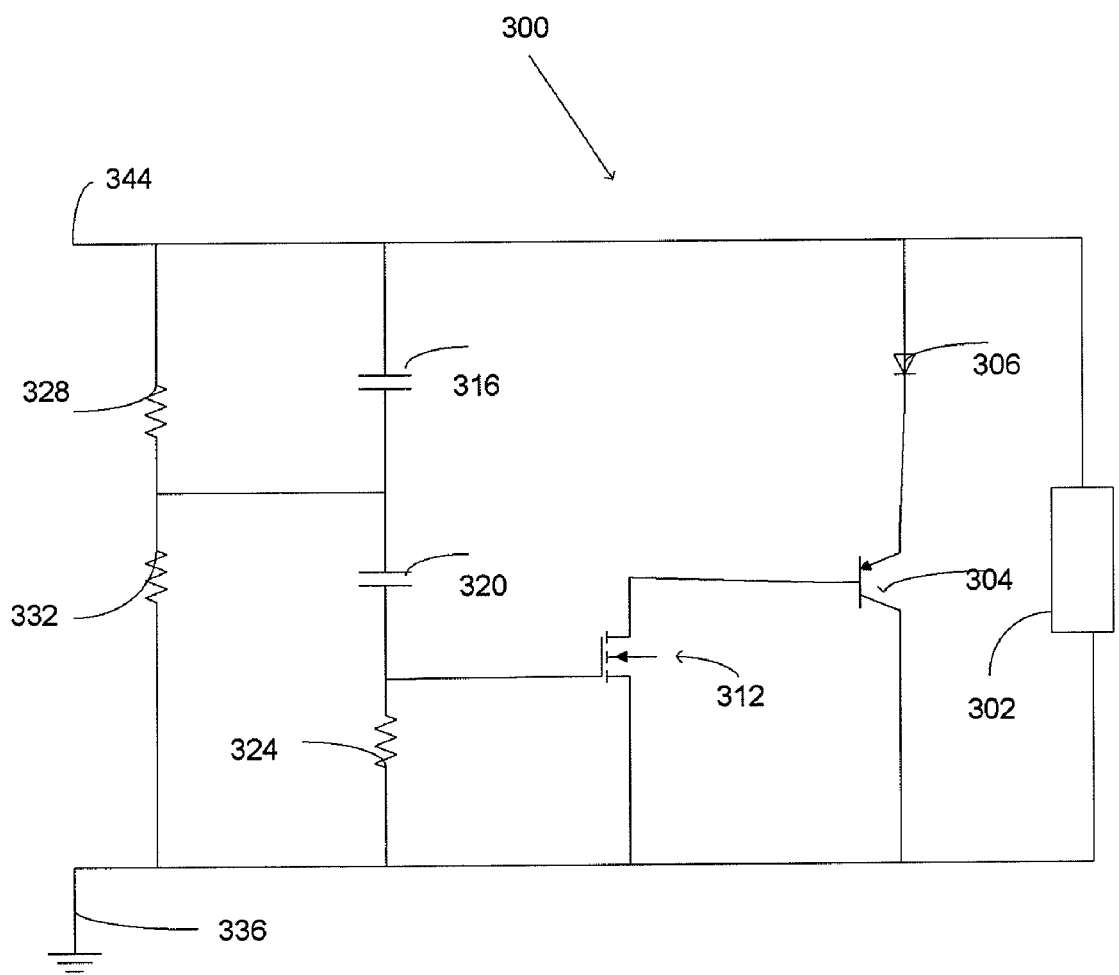
FIG. 3 shows an ESD protection circuit in accordance with another example embodiment.

FIG. 3 shows an ESD protection circuit 300 in accordance with another example embodiment. The ESD protection circuit 300 is similar to the ESD protection circuit 200 shown in FIG. 2 except that the ESD protection circuit 300 utilizes a PNP transistor 304 and an NMOS transistor 312. The construction and operation of the ESD protection circuit 300 is now briefly discussed.

As shown in FIG. 3, the PNP transistor 304 and a PN diode 306 are connected in series between a source voltage 344 and ground 336. The NMOS transistor 312 is connected to the PNP transistor 304 to either turn on or off the PNP transistor 304. Capacitors 316 and 320 and a resistor 324 form an R-C network coupled to the NMOS transistor 312. A voltage divider comprising resistors 328 and 332 is coupled to the R-C network. During normal operation, the voltage at the gate terminal of the NMOS transistor 312 is approximately equal to the ground voltage, which causes the NMOS transistor 312 to be turned off. Consequently, the PNP transistor 304 remains turned off. When electrostatic discharge occurs at the voltage source 344, the voltage at the gate terminal of the NMOS transistor 312 rises, causing the NMOS transistor 312 to turn on, thereby causing the PNP transistor 304 to be turned on. As a result, the electrostatic discharge at the voltage source flows through the diode 306 and the PNP transistor to the ground 336. The characteristics of the R-C network causes the voltage to return to approximately ground voltage after a predetermined duration of time, causing the NMOS transistor 312 to turn off, thereby causing the PNP transistor 304 to turn off. The diode 306 acts to protect the PNP transistor 304. The voltage divider circuit comprising the resistors 328 and 332 allows the capacitors 316 and 320 and the NMOS transistor 312 to operate a higher voltage than allowable based on their respective voltage ratings. The diode 306 also allows the PNP transistor 304 and NMOS transistor 312 to operate at a higher source voltage 344 than allowable based on their voltage ratings. Thus, the voltage divider comprising the resistors 328 and 332 and the diode 306 allow the transistor components to operate at higher than their voltage rating.

The P terminal of the PN diode 306 is connected to a voltage source 344 and the N terminal is connected to the emitter terminal of the PNP transistor 304. The drain terminal of the NMOS transistor 312 is connected to the base terminal of the PNP terminal.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

For example, it will be apparent to those skilled in the art that the voltage divider comprising the resistors 260 and 264 shown in FIG. 2 and the voltage divider comprising the resistors 328 and 332 in FIG. 3 can be constructed using PMOS and/or NMOS transistors and resistors and/or various combinations thereof. Also, the diodes shown in both FIG. 2 and FIG. 3 can be connected between the source voltage and the transistor or can be connected between the transistor and the ground.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed is:

1. An electrostatic discharge (ESD) protection circuit, comprising:
    an NPN transistor having a collector terminal connected to a voltage source, the NPN transistor having an emitter terminal connected to the ground via a diode, the NPN transistor having a base terminal for receiving a base current to turn on the NPN transistor to allow an electrostatic discharge at the voltage source to flow through the NPN transistor to the ground;
    a PMOS transistor having a source terminal coupled to the voltage source, the PMOS terminal having a drain terminal coupled to the base terminal of the NPN transistor, the PMOS transistor having a gate terminal for receiving a first and a second gate voltage;
    an R-C circuit coupled between the source voltage and the ground, the R-C circuit having first and second capacitors and a first resistor, the R-C circuit having a first interconnection point between the first resistor and the first capacitor to which is connected the gate terminal of the PMOS transistor and a second interconnection point between the first and second capacitors, the R-C circuit being operable to supply the first gate voltage to the PMOS transistor when there is no electrostatic discharge to turn off the PMOS transistor, the R-C circuit being operable to supply the second gate voltage to the PMOS transistor responsive to the electrostatic discharge to turn on the PMOS transistor for a predetermined time period, the second gate voltage being lower than the first gate voltage, the PMOS circuit being operable to supply the base voltage to the NPN transistor responsive to the second gate voltage; and
    a voltage divider circuit coupled between the voltage source and the ground, the voltage divider having second and third resistors forming a third interconnection point to which is connected the second interconnection point.

2. The ESD protection circuit of claim 1, wherein the diode has a first and a second terminal, wherein the first terminal of the diode is connected to the emitter terminal of the NPN transistor and wherein the second terminal of the diode is connected to the ground.

3. The ESD protection circuit of claim 1, wherein the diode is a PN diode, wherein the P terminal of the diode is connected to the emitter terminal of the NPN transistor and wherein the N terminal of the diode is connected to the ground.

4. The ESD protection circuit of claim 1, wherein the second gate voltage is a low voltage operable to turn on the PMOS transistor.

5. An electrostatic discharge (ESD) protection circuit, comprising:
    an NPN transistor having a collector terminal connected to a voltage source, the NPN transistor having an emitter terminal connected to the ground, the NPN transistor having a base terminal for receiving a base current to turn on the NPN transistor to allow an electrostatic discharge at the voltage source to flow through the NPN transistor to the ground;
    a PMOS transistor connected to the NPN transistor for supplying the base current to turn on the NPN transistor for a predetermined time period responsive to the electrostatic discharge at the voltage source;
    an R-C circuit connected between the voltage source and the ground, the R-C circuit having first and second capacitors and a first resistor, the R-C circuit having a first interconnection point between the first resistor and the first capacitor to which is connected the gate terminal of the PMOS transistor and a second interconnection point between the first and second capacitors, the R-C circuit being operable to supply a first gate voltage to turn off the PMOS transistor when there is no electrostatic discharge, the R-C circuit being operable to supply a second gate voltage to the PMOS transistor responsive to the electrostatic discharge to turn on the PMOS transistor, the second gate voltage being lower than the first gate voltage; and
    a voltage divider circuit coupled between the voltage source and the ground, the voltage divider having second and third resistors forming a third interconnection point to which is connected the second interconnection point.

6. The ESD protection circuit of claim 5, further comprising a diode connected in series between the NPN transistor and the ground.

7. The ESD protection circuit of claim 5, further comprising a diode having a first and a second terminal, wherein the first terminal of the diode is connected to the emitter terminal of the NPN transistor and the second terminal of the diode is connected to the ground.

8. An electrostatic discharge (ESD) protection circuit, comprising:
    an NPN transistor connected between a voltage source and a ground, the NPN transistor receiving a base current responsive to an electrostatic discharge at the voltage source to turn on the NPN transistor to allow the electrostatic discharge to flow through the NPN transistor to the ground;
    a PMOS transistor connected to the NPN transistor for supplying the base current to turn on the NPN transistor for a predetermined time period responsive to a low voltage at the gate terminal of the PMOS transistor;
    an R-C circuit connected between the voltage source and the ground, the R-C circuit having first and second capacitors and a first resistor, the R-C circuit having a first interconnection point between the first resistor and the first capacitor to which is connected the gate terminal of the PMOS transistor and a second interconnection point between the first and second capacitors, the R-C circuit being operable to supply a high voltage to turn off the PMOS transistor when there is no electrostatic discharge, the R-C circuit being operable to supply the low voltage to the PMOS transistor responsive to the electrostatic discharge to turn on the PMOS transistor; and
    a voltage divider circuit coupled between the voltage source and the ground, the voltage divider having second and third resistors forming a third interconnection point to which is connected the second interconnection point.

9. The ESD protection circuit of claim 8, further comprising at least one diode connected in series between the NPN transistor and the ground.

10. The ESD protection circuit of claim 1, further comprising at least a second diode connected in series with the NPN transistor.

11. An electrostatic discharge (ESD) protection circuit, comprising:
    a PNP transistor connected between a voltage source and a ground, the PNP transistor being operable to turn on responsive to an electrostatic discharge at the voltage source to allow the electrostatic discharge to flow through the PNP transistor to the ground;

an NMOS transistor connected to the PNP transistor to turn on the PNP transistor for a predetermined time period responsive to a high voltage at the gate terminal of the NMOS transistor;

an R-C circuit connected between the voltage source and the ground, the R-C circuit having first and second capacitors and a first resistor, the R-C circuit having a first interconnection point between the first resistor and the second capacitor to which is connected the gate terminal of the PMOS transistor and a second interconnection point between the first and second capacitors, the R-C circuit being operable to supply a low voltage to turn on the NMOS transistor when there is no electrostatic discharge, the R-C circuit being operable to supply the high voltage to the NMOS transistor responsive to the electrostatic discharge to turn on the NMOS transistor; and a voltage divider circuit coupled between the voltage source and the ground, the voltage divider having second and third resistors forming a third interconnection point to which is connected the second interconnection point.

12. The ESD protection circuit of claim 11, further comprising at least one diode connected in series with the PNP transistor.

\* \* \* \* \*